United States Patent
Horinouchi et al.

(10) Patent No.: US 11,912,855 B2
(45) Date of Patent: Feb. 27, 2024

(54) RESIN COMPOSITION FOR MOLDING

(71) Applicants: SEKISUI CHEMICAL CO., LTD., Osaka (JP); TOKUYAMA SEKISUI CO., LTD., Osaka (JP)

(72) Inventors: Tomohiro Horinouchi, Yamaguchi (JP); Hiroshi Taniguchi, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 188 days.

(21) Appl. No.: 17/437,292

(22) PCT Filed: Mar. 27, 2020

(86) PCT No.: PCT/JP2020/014261
§ 371 (c)(1),
(2) Date: Sep. 8, 2021

(87) PCT Pub. No.: WO2020/203863
PCT Pub. Date: Oct. 8, 2020

(65) Prior Publication Data
US 2022/0177690 A1  Jun. 9, 2022

(30) Foreign Application Priority Data
Mar. 29, 2019 (JP) .................. 2019-068513

(51) Int. Cl.
C08L 27/24 (2006.01)
C08L 9/00 (2006.01)
C08K 5/58 (2006.01)
C08K 5/103 (2006.01)

(52) U.S. Cl.
CPC ............. *C08L 27/24* (2013.01); *C08K 5/103* (2013.01); *C08K 5/58* (2013.01); *C08L 9/00* (2013.01); *C08L 2205/03* (2013.01)

(58) Field of Classification Search
CPC ...... C08L 27/24; C08L 2205/02; C08L 27/06; C08F 8/22; C08F 114/06
See application file for complete search history.

(56) References Cited

U.S. PATENT DOCUMENTS

| 4,370,286 A * | 1/1983 | Nehmey ............... C08J 9/0061 521/145 |
| 7,439,293 B2 * | 10/2008 | Perkins .................. B29C 48/12 524/437 |
| 2010/0063247 A1 | 3/2010 | Sanni et al. |
| 2017/0183491 A1 | 6/2017 | Matsumura et al. |
| 2020/0199342 A1 * | 6/2020 | Taniguchi ............... C08L 27/24 |

FOREIGN PATENT DOCUMENTS

| CA | 2567918 A1 * | 5/2008 | ............. B29C 48/09 |
| JP | 2002-273790 | 9/2002 | |
| JP | 2002-284950 | 10/2002 | |
| JP | 2003-292712 | 10/2003 | |
| JP | 2008-274052 | 11/2008 | |
| WO | WO-03074274 A1 * | 9/2003 | ............. B32B 27/30 |
| WO | 2008/062526 | 5/2008 | |
| WO | 2016/013638 | 1/2016 | |

OTHER PUBLICATIONS

ADVASTAB TM-181 FS Thermal Stabilizer, Datasheet (Year: 2009).*
Zhou et al. Toughening of Polyvinylchloride by Methyl Methacrylate-Butadiene-Styrene Core-Shell Rubber Particles: Influence of Rubber Particle Size; Polym. Eng. Sci. 52, 2523-2529, 2012. (Year: 2012).*
A-C (R) 629A Technical Datasheet, Universal Selector (edited in 2022) and Honeywell (Jun. 2010), two separate datasheets attached.*
International Search Report dated Jun. 9, 2020 in International (PCT) Application No. PCT/JP/2020/014261.

* cited by examiner

*Primary Examiner* — Marc S Zimmer
*Assistant Examiner* — Surbhi M Du
(74) *Attorney, Agent, or Firm* — WENDEROTH, LIND & PONACK, L.L.P.

(57) ABSTRACT

The present invention provides a resin composition for molding capable of producing a molded article that has excellent heat distortion resistance, excellent mechanical properties, high impact resistance, and high transparency and has a smaller change in weight at high temperature. The present invention also provides a molded article and a joint each produced from the resin composition for molding. Provided is a resin composition for molding, including: a chlorinated polyvinyl chloride resin; a polyvinyl chloride; and a thermal stabilizer, the chlorinated polyvinyl chloride resin containing structural units (a) to (c) represented by the following formulas (a) to (c) in proportions of 5 to 90 mol % of the structural unit (a), 5 to 40 mol % of the structural unit (b), and 5 to 55 mol % of the structural unit (c) based on a total number of moles of the structural units (a), (b), and (c), the polyvinyl chloride being contained in an amount of 1 to 30 parts by mass based on 100 parts by mass of the chlorinated polyvinyl chloride resin,

[Chem. 1]

—$CH_2$—CHCl—  (a)

—$CH_2$—$CCl_2$—  (b)

—CHCl-CHCl—  (c)

6 Claims, No Drawings

RESIN COMPOSITION FOR MOLDING

TECHNICAL FIELD

The present invention relates to a resin composition for molding capable of producing a molded article that has excellent heat distortion resistance, excellent mechanical properties, high impact resistance, and high transparency and has a smaller change in weight at high temperature. The present invention also relates to a molded article and a joint each produced from the resin composition for molding.

BACKGROUND ART

Polyvinyl chlorides (hereafter, referred to as PVCs) have excellent mechanical strength, weather resistance, and chemical resistance, and thus have been used in various fields. PVCs, however, have poor heat resistance. This has led to the development of chlorinated polyvinyl chloride resins (hereafter, referred to as CPVCs), which are PVCs chlorinated to have improved heat resistance. PVCs have a low heat distortion temperature and the upper limit of the usable temperature thereof is at around 60° C. to 70° C., which does not allow the use of PVCs with hot water. In contrast, CPVCs have a higher heat distortion temperature than PVCs by 20° C. to 40° C. and therefore are usable with hot water. Such CPVCs are suitably used in heat-resistant joints, heat-resistant pipes, heat-resistant bulbs, heat-resistant plates, or the like.

Pipes and joints are often joined with adhesives. Too much or too little adhesives will cause joint failures and therefore, a certain amount of adhesive needs to be applied uniformly to a joining surface. Insufficient insertion of pipes also causes serious joint failures.

Accordingly, transparent joints are used which enable visual check of the application state of the adhesive and the joining state of the pipes.

CITATION LIST

Patent Literature

Patent Literature 1: JP 2008-274052 A

SUMMARY OF INVENTION

Technical Problem

Conventional techniques, however, hardly provide transparent joints having high heat distortion resistance. A demand for joints is a smaller change in performance at significantly high temperature of 100° C. or higher.

In addition to transparency and heat distortion resistance, joints are demanded to have impact resistance. Conventional transparent joints, such as one disclosed in Patent Literature 1, tend to have fractures or cracks with use, causing falling of the pipe or water leakage.

The present invention aims to provide a resin composition for molding capable of producing a molded article that has excellent heat distortion resistance, excellent mechanical properties, high impact resistance, and high transparency and has a smaller change in weight at high temperature. The present invention also aims to provide a molded article and a joint each produced from the resin composition for molding.

Solution to Problem

The present invention relates to a resin composition for molding including: a chlorinated polyvinyl chloride resin; a polyvinyl chloride; and a thermal stabilizer, the chlorinated polyvinyl chloride resin containing structural units (a) to (c) represented by the following formulas (a) to (c) in proportions of 5 to 90 mol % of the structural unit (a), 5 to 40 mol % of the structural unit (b), and 5 to 55 mol % of the structural unit (c) based on a total number of moles of the structural units (a), (b), and (c), the polyvinyl chloride being contained in an amount of 1 to 30 parts by mass based on 100 parts by mass of the chlorinated polyvinyl chloride resin.

The present invention is specifically described in the following.

The present inventors made intensive studies to find that addition of a thermal stabilizer and a polyvinyl chloride each in a predetermined amount to a resin composition for molding containing a chlorinated polyvinyl chloride resin enables the resin composition for molding to provide a molded article that has excellent heat distortion resistance, excellent mechanical properties, high impact resistance, and high transparency and has a smaller change in weight at high temperature. Thus, the present invention was completed.

The resin composition for molding of the present invention contains a chlorinated polyvinyl chloride resin (hereafter, also referred to as "CPVC").

The chlorinated polyvinyl chloride resin contains structural units (a) to (c) represented by the following formulas (a) to (c). The proportion of the structural unit (a) is 5 to 90 mol %, the proportion of the structural unit (b) is 5 to 40 mol %, and the proportion of the structural unit (c) is 5 to 55 mol %, based on the total number of moles of the structural units (a), (b), and (c). Such a chlorinated polyvinyl chloride resin shows uniform gelling characteristics in melt kneading and can provide a molded article with less unevenness on the surface.

In the present invention, the proportions of the following structural units (a), (b), and (c) are important for securing high transparency. The ratio of the proportions of the following structural units (a), (b), and (c) is an indication of the ease with which dehydrochlorination occurs, and the presence of adjacent chlorine atoms can lead to dehydrochlorination (scorch), resulting in a loss of transparency. Dehydrochlorination also affects the refractive index, and when light scattering occurs, transparency may be reduced.

[Chem. 1]

  (a)

  (b)

  (c).

The molar ratios of the structural units (a), (b), and (c) in the chlorinated polyvinyl chloride resin reflect the site to which chlorine is introduced at the time of chlorination of the polyvinyl chloride (PVC). As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. An increase in this nonuniformity causes variations in gelling characteristics in melt kneading of the chlorinated polyvinyl chloride resin, which will severely impair the smoothness of the molded article surface.

In contrast, in the present invention, setting the molar ratios of the structural units (a), (b), and (c) within the above range enables the chlorinated polyvinyl chloride resin to have high uniformity and exhibit good gelling characteristics in melt kneading.

In the chlorinated polyvinyl chloride resin, the proportion of the structural unit (a) is preferably 30 to 90 mol %, more preferably 35 to 60 mol %, based on the total number of moles of the structural units (a), (b), and (c). The proportion of the structural unit (b) is preferably 5 to 30 mol %, more preferably 15 to 25 mol %, based on the total number of moles of the structural units (a), (b), and (c). The proportion of the structural unit (c) is preferably 5 to 50 mol %, more preferably 25 to 45 mol %, based on the total number of moles of the structural units (a), (b), and (c).

Regarding the molar ratios of the structural units (a), (b), and (c) in the chlorinated polyvinyl chloride resin of the present invention, the value obtained by subtracting the proportion of the structural unit (b) from the proportion of the structural unit (c) [(c)–(b)] is preferably within the range of –6 to 48 mol %. The ratio of the proportion of the structural unit (b) and the structural unit (c) [(b)/(c)] is preferably within the range of 0.10 to 7.00.

When the value [(c)–(b)] and the ratio [(b)/(c)] are within the above ranges, the resulting molded product has good optical characteristics without a loss in transparency.

The molar ratios of the structural units (a), (b), and (c) in the chlorinated polyvinyl chloride resin of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

In the chlorinated polyvinyl chloride resin, the amount of added chlorine is preferably 6.3 to 15.2% by mass.

When the amount of added chlorine is 6.3% by mass or more, the molded article has sufficient heat distortion resistance. When the amount of added chlorine is 15.2% by mass or less, moldability is improved.

The amount of added chlorine is more preferably 9.3% by mass or more, and more preferably 12.3% by mass or less.

To determine the amount of added chlorine in the chlorinated polyvinyl chloride resin, the chlorine content of the resin is first measured by the method specified in JIS K 7229. The obtained chlorine content is subtracted from the chlorine content (56.8% by mass) of a polyvinyl chloride, thereby determining the amount of added chlorine.

The degree of polymerization of the chlorinated polyvinyl chloride resin is not limited, and is preferably 400 to 2,000, more preferably 500 to 1,000.

When the degree of polymerization is within the above range, fluidity in molding and the strength of the molded article can be both achieved.

The chlorinated polyvinyl chloride resin has a glass transition temperature of preferably 80° C. to 150° C., more preferably 85° C. to 145° C. When the glass transition temperature is within the above range, a resin composition for molding excellent in heat distortion resistance can be obtained.

A difference in glass transition temperature between the chlorinated polyvinyl chloride resin and a polyvinyl chloride (glass transition temperature of chlorinated polyvinyl chloride resin-glass transition temperature of polyvinyl chloride) is preferably 5° C. to 90° C., more preferably 20° C. to 75° C. The glass transition temperature can be determined based on a DSC curve obtained when the temperature is changed at a predetermined rate of temperature rise and a predetermined rate of temperature drop using a differential scanning calorimetry (DSC) device (DSC Q20, available from TA Instruments Waters).

The chlorinated polyvinyl chloride resin may be produced by, for example, a method including preparing a suspension in a reaction vessel by suspending a polyvinyl chloride in an aqueous medium, introducing chlorine into the reaction vessel, and heating the suspension to chlorinate the polyvinyl chloride.

In particular, in the method of chlorinating a polyvinyl chloride, appropriate adjustment of the vortex volume and chlorination conditions (e.g., chlorination temperature, chlorine pressure) enables production of the chlorinated polyvinyl chloride resin constituting the resin composition for molding of the present invention.

The reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by weight based on 100 parts by weight of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be brown into the reaction vessel, as required. It is preferred to use chlorine after purging 5 to 10% by weight of chlorine from the cylinder.

While the gauge pressure in the reaction vessel is not limited, it is preferably from 0 to 2 MPa, because the higher the chlorine pressure is, the more readily the chlorine will penetrate into the PVC particles.

The method of chlorinating the PVC in the suspended state is not limited. Examples of the chlorination method include a method in which the excitation of bonding of the PVC and chlorine is brought about by thermal energy to accelerate the chlorination (hereinafter referred to as thermal chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor wall is effective. The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

Preferred among the above chlorination methods is a thermal chlorination method involving no ultraviolet irradiation. Preferred is a method in which the excitation of bonding of the polyvinyl chloride and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 40° C. to 120° C. When the temperature is excessively low, the rate of chlorination will decrease. When the temperature is excessively high, dehydrochlorination reaction will occur along with the chlorination reaction, which causes discoloration of the resulting CPVC. The heating temperature is more preferably 50° C. to 110° C. The heating method is not limited, and heating may be performed with an external jacket from the reaction vessel wall, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease. When hydrogen peroxide is added as described above, the rate of chlorination is improved, so that the heating temperature can be set relatively low. The heating temperature may be 65° C. to 110° C., for example.

During the chlorination, it is preferred to perform chlorination at a chlorine consumption rate of 0.010 to 0.015 kg/PVC-kg·5 min after the amount of added chlorine reaches a value that is five percentage points by weight lower than the final amount of added chlorine, and further perform chlorination at a chlorine consumption rate of 0.005 to 0.010 kg/PVC-kg·5 min after the amount of added chlorine reaches a value that is three percentage points by weight lower than the final amount of added chlorine. As used herein, the term "chlorine consumption rate" refers to the amount of chlorine consumed in 5 minutes per kilogram of the raw material PVC.

When chlorination is performed using the above method, a CPVC having less nonuniformity in the chlorinated state and having excellent thermal stability can be obtained.

In the above chlorination method, preferably, the chlorination is performed while the suspension is stirred. The suspension is stirred preferably under such conditions that the ratio of the vortex volume (unit: L) and the total weight (kg) of the raw material PVC and water is 0.009 to 0.143.

When the ratio is 0.009 or higher, chlorine in the gas phase in the reaction vessel can be sufficiently taken in the liquid phase. When the ratio is 0.143 or lower, the chlorine taken in the liquid phase is less likely to be re-released into the gas phase, allowing uniform chlorination.

The vortex volume means the volume of a vortex formed at the liquid-gas interface during stirring.

For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. Here, the stirring blade, which is the stirring power, produces pressure in the liquid and sets the liquid phase at a positive pressure and the gas phase at a negative pressure. This makes it possible to determine the interface between the gas phase and the liquid phase as the border between the positive pressure and the negative pressure.

The stirring blade rotation rate in stirring is preferably 10 to 500 rpm. The capacity of the reaction vessel is preferably 0.01 $m^3$ to 100 $m^3$.

In the resin composition for molding of the present invention, the amount of the CPVC is preferably 50 to 96% by mass, more preferably 65 to 96% by mass. The amount is still more preferably 70 to 93% by mass, particularly preferably 70 to 91% by mass. Containing the CPVC within this range, the resin composition for molding of the present invention can provide a molded article having both heat distortion resistance and impact resistance and being excellent in surface smoothness.

The resin composition for molding of the present invention contains a polyvinyl chloride (hereafter, also referred to as "PVC").

The use of the polyvinyl chloride and the chlorinated polyvinyl chloride resin in combination can impart sufficient thermal stability, and such a resin composition for molding is suitably usable in a variety of molding methods.

In the present invention, a polyvinyl chloride refers to a polymer mainly containing the structural unit (a) represented by the formula (a). Specifically, the proportion of the structural unit (a) is preferably 51 to 100 mol %.

The PVC used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth)acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among these are ethylene and vinyl acetate.

The polymer to which vinyl chloride is graft copolymerized is not limited as long as vinyl chloride can be graft copolymerized. Examples of such a polymer include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers. Examples also include acrylonitrile-butadiene copolymers, polyurethane, chlorinated polyethylene, and chlorinated polypropylene. These may be used singly or in combination of two or more.

The method of polymerizing the PVC is not limited, and a conventionally known method such as aqueous suspension polymerization, bulk polymerization, solution polymerization, or emulsion polymerization can be used.

The PVC has a chlorine content of lower than 56.8% by mass.

When the chlorine content is within the above range, the resin composition for molding has better moldability and a resulting molded article has higher heat distortion resistance. The chlorine content is preferably 36.8 to 56.7% by mass.

The PVC has a degree of polymerization of 400 to 1,000. When the degree of polymerization is within the above range, the resin composition for molding as a product is satisfactory in both fluidity and product strength. The lower limit of the degree of polymerization of the PVC is preferably 500 and the upper limit thereof is preferably 800.

The difference in the degree of polymerization between the chlorinated polyvinyl chloride resin and the polyvinyl chloride is preferably 500 or less. When the difference in the degree of polymerization is within the above range, the resin composition for molding as a product is satisfactory in both fluidity and product strength. The difference is more preferably 300 or less.

In the resin composition for molding of the present invention, the lower limit of the amount of the polyvinyl chloride is 1 part by mass and the upper limit thereof is 30 parts by mass based on 100 parts by mass of the chlorinated polyvinyl chloride resin. Addition of the polyvinyl chloride within this range further improves thermal stability, as well as maintaining favorable appearance of a resulting molded article.

The lower limit of the amount of the polyvinyl chloride is preferably 5 parts by mass and the upper limit thereof is preferably 20 parts by mass.

The amount of the polyvinyl chloride in the entire resin composition for molding of the present invention is preferably 0.8 to 18% by mass, more preferably 2 to 18% by mass.

In addition, the total amount of the chlorinated polyvinyl chloride resin and the polyvinyl chloride in the entire resin composition for molding of the present invention is preferably 55 to 96% by mass.

In the resin composition for molding of the present invention, the amount of a vinyl chloride unit in the entire composition is preferably 5 to 80% by mass, more preferably 10 to 65% by mass. In such a case, the resin composition for molding can have sufficient moldability to be suitably usable in a variety of molding methods. The "amount of a vinyl chloride unit in the entire composition" can be calculated based on the mass of the entire composition for molding and the total mass of the amount corresponding to the structural unit (a) in the chlorinated polyvinyl chloride resin and the amount corresponding to the structural unit (a) in the polyvinyl chloride.

In the resin composition for molding of the present invention, the amount of the vinyl chloride unit based on the total amount of the chlorinated polyvinyl chloride resin and the polyvinyl chloride is preferably 10 to 80% by mass. In such a case, the resin composition for molding can have favorable transparency to provide various transparent molded articles. The "amount of the vinyl chloride unit based on the total amount of the chlorinated polyvinyl chloride resin and the polyvinyl chloride" can be calculated based on the total amount of the chlorinated polyvinyl chloride resin and the polyvinyl chloride in the composition for molding and the total mass of the amount corresponding to the structural unit (a) in the chlorinated polyvinyl chloride resin and the amount of the structural unit (a) in the polyvinyl chloride.

The resin composition for molding of the present invention contains a thermal stabilizer. In the present invention, the thermal stabilizer is preferably an organotin stabilizer. The stabilizer containing calcium alkylcarboxylate and a zinc compound is preferably used.

Examples of the organotin stabilizer include alkyltins (e.g., methyltin, butyltin, octyltin), preferably dialkyltin salts of aliphatic monocarboxylic acids such as lauric acid or of dicarboxylic acids such as maleic acid and phthalic acid. Specific examples thereof include dibutyltin dilaurate, dioctyltin laurate, dibutyltin maleate, dibutyltin phthalate, dimethyltin bis(2-ethylhexylthioglycolate), and alkyltin mercaptides such as dibutyltin mercaptide and dimethyltin mercaptide.

The thermal stabilizer preferably has a loss on heating at 230° C. of less than 5% by mass.

When the loss on heating at 230° C. is 5% by mass or more, a resulting molded article may contain bubbles therein to have insufficient strength or have a streak-like pattern at around the surface to have a defective appearance.

The loss on heating at 230° C. is more preferably less than 3% by mass.

The lower limit is not limited. Yet, it is preferably 0.1% by mass.

The loss on heating at 230° C. can be measured using a thermogravimetry (TG) device.

In the resin composition for molding of the present invention, the amount of the thermal stabilizer is preferably 0.4 to 10 parts by mass, more preferably 0.6 to 7 parts by mass based on 100 parts by mass of the chlorinated polyvinyl chloride resin. Containing the thermal stabilizer within this range, the resin composition for molding has still higher thermal stability, while maintaining a favorable appearance of a resulting molded article.

The resin composition for molding of the present invention preferably contains a stabilization aid. Containing the stabilization aid, the resin composition for molding has still higher thermal stability.

A stabilization aid containing no heavy metal is usable. Examples thereof include organic acid salts, epoxy compounds, phosphoric acid compounds, metal hydroxides, sodium adipates, glycidyl (meth)acrylate copolymers, oxetanyl compounds, vinyl ether compounds, and zeolite compounds.

Examples of the epoxy compounds include epoxidized soybean oil, epoxidized linseed oil, epoxidized tetrahydrophthalate, epoxidized polybutadiene, and bisphenol A-type epoxy compounds.

Examples of the phosphoric acid compounds include organopohosphorus compounds, phosphorous acid esters, and phosphoric acid esters.

Examples of the metal hydroxides include calcium hydroxide and sodium hydroxide.

These stabilization aids may be used singly or in combinations of two or more. The stabilization aid herein is different from calcium alkyl carboxylate or a zinc compound.

The stabilization aid preferably has a loss on heating at 200° C. of less than 5% by mass.

The resin composition for molding of the present invention preferably contains diene rubber particles.

The diene rubber particles are used for the purpose of improving the impact resistance of a resulting molded article. The diene rubber particles contain a diene rubber component.

The diene rubber component may be a homopolymer or a copolymer (including a binary copolymer and a ternary copolymer). Specifically, a copolymer containing a diene component as a copolymer component is referred to as a diene rubber component. The copolymer may be obtained by any of random copolymerization, alternating copolymerization, block copolymerization, and graft copolymerization.

Examples of the diene component include butadiene, isoprene, and chloroprene.

Examples of the diene rubber component include a copolymer containing a monomer component selected from the group consisting of unsaturated nitriles, α-olefins, and aromatic vinyls. The examples further include a copolymer of an unsaturated nitrile and a diene component, a copolymer of an aromatic vinyl and a diene component, a copolymer of an olefin and a diene component, and a copolymer of a (meth)acrylate monomer component and a diene component.

More specific examples of the diene rubber component include an acrylonitrile-butadiene copolymer, a butadiene-styrene copolymer, a styrene-isoprene copolymer, and an ethylene-propylene-diene copolymer. The diene rubber component used is preferably a methyl methacrylate-butadiene-styrene copolymer (MBS), an acrylonitrile-butadiene-styrene copolymer (ABS), a methyl methacrylate-acrylonitrile-butadiene-styrene copolymer (MABS), a methyl methacrylate-butadiene copolymer (MB), or the like.

The diene rubber component used is preferably a methyl methacrylate-acrylate butadiene rubber copolymer or a methyl methacrylate-acrylte butadiene rubber-styrene copolymer. Among these, more preferred is/are a methyl methacrylate-butadiene-styrene copolymer and/or an acrylonitrile-butadiene-styrene copolymer.

In the case where the diene rubber component is a diene component-containing copolymer, the amount of the diene component is preferably 30 to 90% by mass, more preferably 40 to 85% by mass, still more preferably 50 to 80% by mass.

In the case where the diene rubber component is a copolymer of an acrylic component and a diene component, the ratio of the acrylic component to the diene component (acrylic component/diene component) is within a range of preferably 0.05 to 3.0, more preferably 0.1 to 2.5, still more preferably 0.1 to 2.0.

The diene rubber particles may contain a non-diene component.

Examples of the non-diene component include a polymer containing one or two or more monomer components selected from the group consisting of olefins and organosiloxanes. More specific examples thereof include olefin rubbers (e.g., ethylene-propylene rubber) and silicone acrylic rubbers.

Examples of the non-diene component include a (meth)acrylate monomer component.

Examples of the (meth)acrylate monomer component include C1-C12 alkyl (meth)acrylates, such as methyl (meth)acrylate, ethyl (meth)acrylate, propyl (meth)acrylate, butyl (meth)acrylate, 2-ethyl (meth)acrylate, and 2-ethylhexyl methacrylate. These monomer components may be used singly or in combinations of two or more (e.g., three monomer components). The examples further include a methyl methacrylate-(acrylic silicone complex) copolymer.

The amount of the (meth)acrylate monomer component in the polymer constituting the diene rubber particles is not limited, and is preferably 25% by mass or more, for example.

The diene rubber particles are in the form of particles, which can improve the dispersibility of the diene rubber particles in the resin composition for molding containing the CPVC.

The lower limit of the average particle size of the diene rubber particles is preferably 0.001 μm and the upper limit thereof is preferably 1.0 μm. When the average particle size is within the above range, transparency and impact resistance can be both achieved. The average particle size can be measured using a laser diffraction particle size distribution analyzer.

The lower limit of the specific gravity of the diene rubber particles is preferably 0.92 g/cm$^3$ and the upper limit thereof is preferably 1.16 g/cm$^3$. When the specific gravity is within the above range, the particles can improve impact resistance without impairing transparency of a resulting molded article. The specific gravity can be measured, for example, with a dry automatic pycnometer (Accupyc 111340, available from Shimadzu Corporation).

In the resin composition for molding of the present invention, the amount of the diene rubber particles is 9.1 to 20.0 parts by mass based on 100 parts by mass of the chlorinated polyvinyl chloride resin. The resin composition for molding containing the diene rubber particles within this range can provide a molded article having still higher impact resistance.

The lower limit of the amount of the diene rubber particles is preferably 10.5 parts by mass and the upper limit thereof is preferably 18.0 parts by mass.

In the resin composition for molding of the present invention, the ratio of the thermal stabilizer and the diene rubber particles (diene rubber particles/thermal stabilizer) is preferably 10.0 or less. The ratio is more preferably 0.6 to 10.0. When the ratio is within this range, a resulting molded article has both heat distortion resistance and impact resistance and is excellent in transparency.

In the resin composition for molding of the present invention, the diene rubber particles have a refractive index of preferably 1.3 to 1.8.

The refractive index can be measured using a refractometer by the Abbe method in conformity with JIS K 71142.

The ratio of the refractive index of the diene rubber particles to the amount of added chlorine of the CPVC (refractive index of diene rubber particles/amount of added chlorine of CPVC) is preferably 0.130 to 0.700. When the ratio is within the above range, the component of the diene rubber and the ratio of the refractive index of the diene rubber to the CPVC synergistically work to achieve both transparency and impact resistance.

The resin composition for molding of the present invention preferably further contains an antioxidant.

The antioxidant used may be, for example, a phenolic antioxidant, a phosphoric acid antioxidant, a sulfur antioxidant, or an amine antioxidant. These antioxidants may be used singly or in combinations of two or more. Among these, preferred is a phenolic antioxidant and particularly preferred is a hindered phenol antioxidant.

Examples of the hindered phenol antioxidant include 2,6-di-t-butyl-p-cresol, 2,6-diphenyl-4-octadecyloxyphenol, stearyl(3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl)

butyric acid] glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5] undecane, and bis[β-(3-t-butyl-4-hydroxy-5-methylphenyl) propionate]. Among these, preferred are 1,3,5-tris(3,5-di-t-butyl-4-hydroxybenzyl)isocyanurate and pentaerythrityl-tetrakis[methylene-3-(3,5-di-t-butyl-4-hydroxyphenyl) propionate]. These may be used singly or in combinations of two or more.

The antioxidant preferably has a loss on heating at 200° C. of less than 5% by mass.

When the loss on heating at 200° C. is 5% by mass or more, a resulting molded article may contain bubbles therein to have insufficient strength or have a streak-like pattern at around the surface to have a defective appearance.

The loss on heating at 200° C. is more preferably less than 3% by mass.

In the resin composition for molding of the present invention, the amount of the antioxidant is preferably 0.1 to 3 parts by mass, more preferably within a range of 0.2 to 2.5 parts by mass based on 100 parts by mass of the chlorinated polyvinyl chloride resin. Containing the antioxidant within this range, the resin composition for molding can provide a molded article less susceptible to discoloration due to yellowing.

The resin composition for molding of the present invention preferably contains a lubricant.

Examples of the lubricant include internal lubricants and external lubricants. The internal lubricants are used to reduce the fluid viscosity of the molten resin in molding to prevent the generation of frictional heat. The external lubricants are used to improve the slip effect between metal surfaces and the molten resin in molding.

The lubricant is not limited, and examples thereof include paraffin waxes, aliphatic hydrocarbon lubricants, polyolefin waxes, higher aliphatic alcohol lubricants, higher fatty acid lubricants, fatty acid ester lubricants, fatty acid amide lubricants, silicon resin lubricants, fluororesin lubricants, silicone oil, phosphoric acid alcohol esters, and carnauba wax.

Examples of the paraffin waxes include liquid paraffin containing 16 or more carbon atoms and partial oxides thereof, and native/synthetic paraffins.

Examples of the polyolefin waxes include polyethylene wax, polyethylene oxide wax, and polypropylene wax.

Examples of the higher aliphatic alcohol lubricants include lauryl alcohol and stearyl alcohol.

The higher fatty acid lubricants are preferably higher fatty acids containing 16 or more carbon atoms, and examples thereof include stearic acid and montanoic acid. The examples further include purified substances of plant oils such as coconut oil, soybean oil, and rapeseed oil.

Examples of the fatty acid ester lubricants include 2,3-dihydroxypropyl octadecanoate, butyl stearate, glycerol monostearate, pentaerythritol fatty acid esters such as pentaerythritol tetrastearate, and dipentaerythritol fatty acid esters.

These may be used singly or in combinations of two or more.

The lubricant preferably has a weight average molecular weight of 200 to 12,000.

The weight average molecular weight can be measured by GPC.

In the present invention, the lubricant preferably includes a low-molecular-weight lubricant having a weight average molecular weight of 1,000 or less and a high-molecular-weight lubricant having a weight average molecular weight of more than 1,000. In such a case, sufficient moldability and transparency can be ensured.

The lubricant preferably has a melting point of 45° C. to 140° C.

The melting point can be measured by differential scanning calorimetry (DSC).

In the present invention, the lubricant preferably includes a low-melting-point lubricant having a melting point of 80° C. or lower and a high-melting-point lubricant having a melting point of higher than 80° C. In such a case, sufficient moldability and transparency can be ensured.

The lubricant preferably has a coagulation point of 40° C. to 130° C.

The coagulation point can be measured by differential scanning calorimetry (DSC).

In the present invention, the lubricant preferably includes a low-coagulation-point lubricant having a coagulation point of 45° C. or lower and a high-coagulation-point lubricant having a coagulation point of higher than 85° C. In such a case, the resin composition for molding is coagulated at high temperature to have lower crystallinity, leading to less likelihood of cloudiness or the like.

The lubricant used preferably has a value of "melting point–coagulation point" of 3° C. to 15° C.

In such a case, sufficient transparency can be ensured. The lower limit of the value of "melting point–coagulation point" is more preferably 7° C., still more preferably 11° C.

The lubricant preferably has a loss on heating at 200° C. of less than 5% by mass.

When the loss on heating is less than 5% by mass, a resulting molded article is less likely to have a cloudy surface. Moreover, this can prevent a trouble that a volatile matter generated on heating causes entrainment of bubbles in the molded article to lower the transparency.

In the resin composition for molding of the present invention, the amount of the lubricant is preferably 0.3 to 5.0 parts by mass based on 100 parts by mass of the chlorinated polyvinyl chloride resin. Containing the lubricant within this range, the resin composition for molding is not likely to have scorch marks or foam during molding to provide a molded article excellent in surface smoothness.

The resin composition for molding of the present invention may optionally contain additives such as processing aids, heat resistance improvers, ultraviolet absorbents, light stabilizers, fillers, thermoplastic elastomers, and pigments.

Examples of the heat resistance improvers include, but are not limited to, α-methylstyrene resins and N-phenylmaleimide resins.

Examples of the light stabilizers include, but are not limited to, hindered amine light stabilizers.

The processing aid used preferably contains an acrylic resin having a weight average molecular weight of 50,000 to 10,000,000.

Examples of the acrylic resin include homopolymers of acrylic acid, methacrylic acid, and (meth)acrylic acid esters, and (meth)acrylic copolymers containing these.

Examples of the (meth)acrylic acid esters include methyl (meth)acrylate, ethyl (meth)acrylate, isopropyl (meth)acrylate, n-butyl (meth)acrylate, and isobutyl (meth)acrylate. Examples of the (meth)acrylic acid esters also include n-amyl (meth)acrylate, isoamyl (meth)acrylate, n-hexyl (meth)acrylate, 2-ethylhexyl (meth)acrylate, and n-octyl (meth)acrylate. Here, the term "(meth)acrylic acid" refers to acrylic acid or methacrylic acid. In the present invention, the acrylic processing aid used is preferably a polymer of methyl (meth)acrylate (MMA).

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the pigments include, but are not limited to, organic pigments such as azo pigments, phthalocyanine pigments, threne pigments, and dye lake pigments; and inorganic pigments such as oxide pigments (e.g., titanium dioxide), sulfide/selenide pigments, and ferrocyanide pigments.

The resin composition for molding of the present invention may contain a plasticizer for the purpose of improving moldabiltiy. However, since a plasticizer may lower the thermal stability of a resulting molded article, the use of a plasticizer in a large amount is not so preferred. Examples of the plasticizer include, but are not limited to, dibutyl phthalate, di-2-ethylhexyl phthalate, and di-2-ethylhexyl adipate.

The resin composition for molding of the present invention may contain a thermoplastic elastomer for the purpose of improving workability. Examples of the thermoplastic elastomer include nitrile thermoplastic elastomers, olefin thermoplastic elastomers, vinyl chloride thermoplastic elastomers, styrene thermoplastic elastomers, urethane thermoplastic elastomers, polyester thermoplastic elastomers, and polyamide thermoplastic elastomers.

Examples of the nitrile thermoplastic elastomers include acrylonitrile-butadiene copolymers (NBR).

Examples of the olefin thermoplastic elastomers include ethylene thermoplastic elastomers such as ethylene-vinyl acetate copolymers (EVA) and ethylene-vinyl acetate-carbon monoxide copolymers (EVACO).

Examples of the vinyl chloride thermoplastic elastomers include vinyl chloride-vinyl acetate copolymers and vinyl chloride-vinylidene chloride copolymers.

These thermoplastic elastomers may be used singly or in combinations of two or more.

The resin composition for molding of the present invention preferably has a heat distortion temperature (HDT) of 90° C. or higher as measured in conformity with ASTM D648. In such a case, thermal expansion and contraction can be reduced.

The resin composition for molding of the present invention preferably has a notched Izod impact strength at a notch part of 40 J/m or higher. This enables production of a molded article excellent in impact resistance.

The resin composition for molding of the present invention preferably has a weight change rate of 0 to 7% when the temperature thereof is raised from 30° C. to 250° C. at a rate of temperature rise of 10° C./min. When the weight change rate is within the above range, sufficient transparency can be ensured.

The weight change rate can be determined by TG/DTA (TG/DTA6200+AST-2, available from Hitachi High-Tech Science Corporation) in which the temperature is raised from 30° C. to 250° C. at a rate of temperature rise of 10° C./min in nitrogen atmosphere.

The resin composition for molding of the present invention is produced, for example, by a method including mixing the chlorinated polyvinyl chloride resin with predetermined amounts of a predetermined thermal stabilizer and a predetermined polyvinyl chloride and optionally adding additives such as antioxidants, diene rubber particles, and lubricants.

The antioxidants, diene rubber particles, and lubricants may be blended by any method such as hot blending or cold blending.

According to another aspect of the present invention, a molded article molded from the resin composition for molding of the present invention is also provided. The present invention also encompasses such a molded article.

The molding method may be any conventionally known molding method, for example, extrusion molding or injection molding.

The molded article of the present invention has excellent thermal stability and good appearance. The molded article of the present invention can therefore be suitably used in applications such as plumbing materials and equipment, building components, and housing materials.

Among these, the molded article of the present invention is preferably used for pipes and joints, specifically for liquid transport pipes and joints thereof for various applications including water/hot water supply, underfloor heating, hot water heating, hot spring piping, chemical spraying, drainage, water spraying, washing machines, dishwashers, toilets, bathrooms, solar systems, mist generators, and farming.

The present invention also encompasses a joint molded from the resin composition for molding of the present invention.

The joint of the present invention is preferably transparent.

Preferred examples of the type of the joint include flange joints, socket joints, tee joints, elbow joints, bend joints, cap joints, valve joints, and reducer joints.

Advantageous Effects of Invention

The present invention can provide a resin composition for molding capable of producing a molded article that has excellent heat distortion resistance, excellent mechanical properties, high impact resistance, and high transparency and has a smaller change in weight at high temperature. The present invention can also provide a molded article and a joint each produced from the resin composition for molding.

The present invention can provide a resin composition for molding excellent in kneading properties in a molding machine and capable of preventing joining failures caused by adhesives used in joining parts, and a molded article and a joint each produced from the resin composition for molding.

DESCRIPTION OF EMBODIMENTS

The present invention is more specifically described in the following with reference to, but not limited to, examples.

Example 1

A glass-lined reaction vessel having an inner capacity of 300 L was charged with 130 kg of deionized water and 50 kg of a polyvinyl chloride having an average degree of polymerization of 800. They were stirred to disperse the polyvinyl chloride in water to prepare an aqueous suspension, and then the inside of the reaction vessel was heated to raise the temperature of the aqueous suspension to 100° C.

Subsequently, the inside of the reaction vessel was depressurized to remove oxygen (oxygen content 100 ppm). Thereafter, while stirring was performed with a stirring blade such that the vortex formed at the liquid-gas interface by stirring had a vortex volume of 8.3 L, chlorine (oxygen content 50 ppm) was introduced at a partial pressure of chlorine of 0.40 MPa, thereby starting thermal chlorination.

Then, the chlorination temperature was kept at 100° C. and the partial pressure of chlorine was kept at 0.40 MPa. After the amount of added chlorine reached 4.2% by mass, addition of a 200 ppm hydrogen peroxide solution was started at 15 ppm/Hr in terms of hydrogen peroxide relative to the polyvinyl chloride, and the average chlorine consumption rate was adjusted to 0.02 kg/PVC-kg·5 min. Thereafter, when the amount of added chlorine reached 10.5% by mass, the supply of hydrogen peroxide solution and chlorine gas was terminated, whereby chlorination was terminated.

Subsequently, unreacted chlorine was removed by nitrogen gas aeration, and the obtained chlorinated polyvinyl chloride resin slurry was neutralized with sodium hydroxide, washed with water, dehydrated, and then dried. Thus, a powdery, thermally chlorinated polyvinyl chloride resin (amount of added chlorine: 10.5% by mass) was obtained.
(Preparation of Chlorinated Polyvinyl Chloride Resin Composition)

To 100 parts by mass of a chlorinated polyvinyl chloride resin (A) [amount of added chlorine: 10.5% by mass, degree of polymerization: 800] was added 3.0 parts by mass of a butyltin mercaptan compound (TVS #1360, available from Nitto Kasei Co., Ltd.) as a thermal stabilizer. Further, 10.0 parts by mass of methyl methacrylate-butadiene-styrene copolymer (MBS) resin particles as diene rubber particles and 8.5 parts by mass of a polyvinyl chloride (chlorine content: 56.8% by mass, degree of polymerization: 700, glass transition temperature: 87° C.) were added and blended. The MBS resin particles used had an average particle size of 0.105 μm, a refractive index of 1.542, a refractive index/amount of added chlorine of 0.148, and a specific gravity of 1.00.

To the mixture were further added 0.5 parts by mass of polyethylene oxide wax, 1.5 parts by mass of 2,3-dihydroxypropyl octadecanoate, and 1.0 parts by mass of dipentaerythritol fatty acid ester. The polyethylene oxide wax, 2,3-dihydroxypropyl octadecanoate, and dipentaerythritol fatty acid ester used were listed below.
- polyethylene oxide wax: Hiwax4202E, available from Mitsui Chemicals, Inc., melting point of 100° C., weight average molecular weight of 2600
- 2,3-dihydroxypropyl octadecanoate; EXCEL T-95, available from Kao Corporation, melting point of 65° C., molecular weight of 350
- dipentaerythritol fatty acid ester: Rikester SL-02, available from Riken Vitamin Co., Ltd., melting point of 63° C., molecular weight of 1853

They were uniformly mixed with a super mixer. Thus, a chlorinated polyvinyl chloride resin composition was obtained.

The structural unit contents of the obtained chlorinated polyvinyl chloride resin (A) were determined by FT-NMR using JEOLJNM-AL-300. The NMR analysis can be performed by the method specified in R. A. Komoroski, R. G. Parker, J. P. Shocker, Macromolecules, 1985, 18, 1257-1265. Table 1 shows the results.

The specific gravity of the MBS resin particles was measured using a dry automatic pycnometer (Accupyc 111340, available from Shimadzu Corporation).

(Production of Joint)

The obtained chlorinated polyvinyl chloride resin composition was supplied to a conical counter-rotating twin screw extruder (OSC-30, available from Osada Seisakusho) with a diameter of 30 mm, and pellets were produced at a resin temperature of 190° C.

The obtained pellets were supplied to an injection molding machine (J350ADS, available from JSW), and a socket-type pipe joint having an external diameter of 34.7 mm and an internal diameter of 26.9 mm was produced at a resin temperature when purged from the nozzle of 220° C.

Examples 2 to 18, Comparative Examples 1 to 14

Chlorinated polyvinyl chloride resin compositions and socket-type pipe joints were produced as in Example 1, except that the types and amounts of the chlorinated polyvinyl chloride resin, polyvinyl chloride, thermal stabilizer, diene rubber particles, and lubricant were changed as shown in Tables 2 and 3.

The structural unit contents, amount of added chlorine, and degree of polymerization of the chlorinated polyvinyl chloride resin used are shown in Table 1.
<Evaluation>

The following evaluations were performed on the chlorinated polyvinyl chloride resins and chlorinated polyvinyl chloride resin compositions obtained in the examples and comparative examples. Tables 2 and 3 show the results.
[Evaluation of Chlorinated Polyvinyl Chloride Resin and Chlorinated Polyvinyl Chloride Resin Composition]
<Mechanical Properties (Izod Impact Strength, Tensile Strength, Tensile Modulus of Elasticity, Heat Distortion Temperature)>

Each of the obtained chlorinated polyvinyl chloride resin compositions was supplied to two 8-inch rolls to be kneaded at 205° C. for three minutes, and formed into 1.0-mm-thick sheets. The obtained sheets were laminated on each other and preheated by pressing at 205° C. for three minutes, and then pressurized for four minutes. Thus, a 3-mm-thick pressed plate was obtained. The obtained pressed plate was machined to provide a specimen. Using the specimen, the Izod impact strength in conformity with ASTM D256 and tensile strength and tensile modulus of elasticity in conformity with ASTM D638 were measured. The heat distortion temperature was also measured at an applied load of 186 $N/cm^2$ in conformity with ASTM D648. The measurement of the heat distortion temperature was performed after annealing of the obtained pressed plate for 24 hours in a gear oven at 90° C.
<Vicat Softening Temperature>

The Vicat softening temperature was measured in conformity with JIS K 7206:2016 (Plastics—Thermoplastic materials—Determination of Vicat softening temperature, B50 method).
<Glass Transition Temperature [Tg]>

The temperature of each of the obtained chlorinated polyvinyl chloride resins was raised from 40° C. to 200° C. at a rate of temperature rise of 5° C./min and then cooled from 200° C. to 40° C. at a rate of temperature drop of 5° C./min using a differential scanning calorimeter (DSC) (DSC Q20, available from TA Instruments Waters). The same operation was repeated, and the glass transition temperature was determined based on the DSC curve obtained from the second temperature rise. The glass transition temperature was determined from the intersection of the extrapolated straight line from the low temperature side before the inflection point and the tangent line at the inflection point. The glass transition temperature of the polyvinyl chloride was determined by the same method.

<Measurement of Haze and Total Light Transmittance>

Each of the obtained chlorinated polyvinyl chloride resin compositions was supplied to two 8-inch rolls to be kneaded at 185° C. for three minutes, and formed into 0.5-mm-thick sheets. The obtained sheets were laminated on each other and preheated by pressing at 180° C. for one minute, and then pressurized for one minute, followed by cooling for two minutes. Thus, a 3-mm-thick pressed plate was obtained. The haze and total light transmittance of the obtained pressed plate were measured using a haze meter (NDH2000, available from Nippon Denshoku Industries Co., Ltd.).

The haze is preferably 80% or lower. The haze is more preferably 75% or lower.

The lower limit is not limited. Yet, the lower limit of the haze is preferably 1%. When the haze is higher than 80%, a resulting molded article has lower transparency. In the case of a joint, for example, when a pipe is inserted into the joint, the state of insertion cannot be checked.

<Determination of Weight Change Rate>

The weight change rate of each of the obtained chlorinated polyvinyl chloride resin compositions when the temperature of the composition is raised from 30° C. to 250° C. at a rate of temperature rise of 10° C./min in nitrogen atmosphere was determined by TG/DTA (AST-2+TG/DTA6200, available from Hitachi High-Tech Science Corporation). The weight change rate (% by mass) was obtained by substituting the values obtained in the measurement into the following equation.

Weight change rate=((Mass at 30° C.–Mass at 250° C.)/(Mass at 30° C.))×100

The weight change rate is preferably 5% by mass or less. The weight change rate is more preferably 4% by mass or less. The lower limit is not limited. Yet, the lower limit of the weight change rate is preferably 0.1% by mass.

The weight change rate of not more than 5% by mass can prevent defects such as entrainment of bubbles inside the molded article or formation of a streak-like pattern at around the surface which adversely affects the transparency.

[Evaluation on Socket-Type Pipe Joint (Molded Article)]

<Visual Evaluation on Joining>

A colored adhesive (Eslon Adhesive, No. 83S White) was applied to an inner surface of the obtained joint. Similarly, the colored adhesive was applied to an outer surface of a chamfered pipe 20A. The pipe was inserted into the joint and the adhesive was dried for a day. Thus, a joining sample was provided.

The acceptability was determined based on the following criteria: the case where the adhesive in the joining portion of the joining sample was visually confirmable properly was rated as "○ (Good)"; and the case where defects of the adhesive (e.g., unevenness, defective adhesion, poor visibility due to a flash in the product) was observed was rated as "x (Poor)".

<Evaluation on Kneading Property>

The pellet obtained in (Production of joint) was supplied to an injection molding machine (J350ADS, available from JSW), and the resin temperature when purged from the nozzle was adjusted to 220° C. Then, the injection unit was placed in contact with the mold, and the rotational torque of the screw was determined in the measurement in which the rotation rate of the screw was 25 rpm and the back pressure was 10 MPa. The acceptability was determined based on the following criteria: the case where the rotational torque was 90% or lower of the rated value was rated as "○ (Good)"; and the case where the rotational torque was higher than 90% of the rated value was rated as "x (Poor)". For stable production, the rotational torque is preferably 90% or lower of the rated value.

<Evaluation on Heat Distortion Resistance>

The obtained joint was placed in an oven at 150° C. and allowed to stand still for one hour. The joint was taken out from the oven and visually checked whether or not foaming was observed and whether or not cracks were formed along the weld line. The acceptability was determined based on the following criteria: the case where no foaming or no cracks along the weld line was/were observed was rated as "○ (Good)"; and the case where foaming and/or cracks along the weld line was/were observed was rated as "x (Poor)".

TABLE 1

|  | Amount of structural unit [mol %] | | | Amount of added chlorine [mass %] | Degree of polymerization | (c) – (b) | (b)/(c) | Tg (° C.) |
|  | Structural unit (a) | Structural unit (b) | Structural unit (c) | | | | | |
| --- | --- | --- | --- | --- | --- | --- | --- | --- |
| Chlorinated polyvinyl chloride resin (A) | 35.9 | 22.4 | 41.7 | 10.5 | 800 | 19.3 | 0.54 | 123.87 |
| Chlorinated polyvinyl chloride resin (B) | 35.9 | 32.4 | 31.7 | 10.5 | 800 | -0.7 | 1.02 | 123.87 |
| Chlorinated polyvinyl chloride resin (C) | 35.9 | 27.4 | 36.7 | 10.5 | 800 | 9.3 | 0.75 | 123.87 |
| Chlorinated polyvinyl chloride resin (D) | 35.9 | 57.4 | 6.7 | 10.5 | 800 | -50.7 | 8.57 | 123.87 |
| Chlorinated polyvinyl chloride resin (E) | 35.9 | 3.4 | 60.7 | 10.5 | 800 | 57.3 | 0.06 | 123.87 |
| Chlorinated polyvinyl chloride resin (F) | 10.0 | 40.0 | 50.0 | 14.8 | 800 | 10.0 | 0.80 | 141.47 |
| Chlorinated polyvinyl chloride resin (G) | 60.0 | 17.0 | 23.0 | 6.6 | 800 | 6.0 | 0.74 | 107.89 |
| Chlorinated polyvinyl chloride resin (H) | 10.0 | 20.0 | 70.0 | 14.8 | 800 | 50.0 | 0.29 | 141.47 |
| Chlorinated polyvinyl chloride resin (I) | 95.0 | 1.0 | 4.0 | 0.8 | 800 | 3.0 | 0.25 | 84.15 |
| Chlorinated polyvinyl chloride resin (J) | 5.0 | 40.0 | 55.0 | 15.6 | 800 | 15.0 | 0.73 | 144.75 |
| Chlorinated polyvinyl chloride resin (K) | 85.0 | 10.0 | 5.0 | 2.5 | 800 | -5.0 | 2.00 | 91.11 |
| Chlorinated polyvinyl chloride resin (L) | 4.0 | 42.0 | 54.0 | 15.7 | 800 | 12.0 | 0.78 | 145.16 |
| Chlorinated polyvinyl chloride resin (M) | 37.0 | 8.0 | 55.0 | 10.3 | 800 | 47.0 | 0.15 | 123.05 |
| Chlorinated polyvinyl chloride resin (N) | 35.0 | 42.0 | 23.0 | 10.7 | 800 | -19.0 | 1.83 | 124.69 |
| Chlorinated polyvinyl chloride resin (O) | 54.0 | 38.0 | 8.0 | 7.5 | 800 | -30.0 | 4.75 | 111.58 |
| Chlorinated polyvinyl chloride resin (P) | 75.0 | 4.0 | 21.0 | 4.1 | 800 | 17.0 | 0.19 | 97.66 |
| Chlorinated polyvinyl chloride resin (Q) | 85.0 | 11.0 | 4.0 | 2.5 | 800 | -7.0 | 2.75 | 91.11 |

TABLE 2

| | | | Example | | | | | |
|---|---|---|---|---|---|---|---|---|
| | | | 1 | 2 | 3 | 4 | 5 | 6 |
| Composition (Parts by mass) | Chlorinated polyvinyl chloride resin (A) | | 100 | — | — | 100 | 100 | — |
| | Chlorinated polyvinyl chloride resin (B) | | — | 100 | — | — | — | — |
| | Chlorinated polyvinyl chloride resin (C) | | — | — | 100 | — | — | — |
| | Chlorinated polyvinyl chloride resin (D) | | — | — | — | — | — | — |
| | Chlorinated polyvinyl chloride resin (E) | | — | — | — | — | — | — |
| | Chlorinated polyvinyl chloride resin (F) | | — | — | — | — | — | 100 |
| | Chlorinated polyvinyl chloride resin (G) | | — | — | — | — | — | — |
| | Chlorinated polyvinyl chloride resin (H) | | — | — | — | — | — | — |
| | Chlorinated polyvinyl chloride resin (I) | | — | — | — | — | — | — |
| | Chlorinated polyvinyl chloride resin (J) | | — | — | — | — | — | — |
| | Chlorinated polyvinyl chloride resin (K) | | — | — | — | — | — | — |
| | Chlorinated polyvinyl chloride resin (L) | | — | — | — | — | — | — |
| | Chlorinated polyvinyl chloride resin (M) | | — | — | — | — | — | — |
| | Chlorinated polyvinyl chloride resin (N) | | — | — | — | — | — | — |
| | Chlorinated polyvinyl chloride resin (O) | | — | — | — | — | — | — |
| | Chlorinated polyvinyl chloride resin (P) | | — | — | — | — | — | — |
| | Chlorinated polyvinyl chloride resin (Q) | | — | — | — | — | — | — |
| | Thermal stabilizer | Butyltin mercaptan compound | 3.0 | 3.0 | 3.0 | 3.0 | 3.0 | 3.0 |
| | Diene rubber particles | MBS (average particle size: 0.105 μm) | 10.0 | 10.0 | 10.0 | 7.3 | 22.0 | 10.0 |
| | Polyvinyl chloride | | 8.5 | 8.5 | 8.5 | 8.5 | 8.5 | 8.5 |
| | Polyethylene oxide wax | | 0.5 | 0.5 | 0.5 | 0.5 | 0.5 | 0.5 |
| | 2,3-Dihydroxypropyl octadecanoate | | 1.5 | 1.5 | 1.5 | 1.5 | 1.5 | 1.5 |
| | Dipentaerythrtol fatty acid ester | | 1.0 | 1.0 | 1.0 | 1.0 | 1.0 | 1.0 |
| | Total | | 124.5 | 124.5 | 124.5 | 121.8 | 136.5 | 124.5 |
| Amount of vinyl chloride unit in the entire composition (mass %) | | | 35.7 | 35.7 | 35.7 | 36.5 | 32.5 | 14.9 |
| Amount of vinyl chloride unit/(Chlorinated polyvinyl chloride resin + polyvinyl chloride) (mass %) | | | 40.9 | 40.9 | 40.9 | 40.9 | 40.9 | 17.1 |
| Ratio | Mass ratio (diene rubber particles/thermal stabilizer) | | 3.3 | 3.3 | 3.3 | 2.4 | 7.3 | 3.3 |
| | Rubber particles | Specific gravity (g/cm³) | 1.00 | 1.00 | 1.00 | 1.00 | 1.00 | 1.00 |
| | | Acrylic component/ diene component | 2.0 | 2.0 | 2.0 | 2.0 | 2.0 | 2.0 |
| Refractive index of rubber particles/amount of added chlorine of Chlorinated polyvinyl chloride resin | | | 0.148 | 0.148 | 0.148 | 0.148 | 0.148 | 0.105 |
| Evaluation (Chlorinated-polyvinyl chloride resin composition) | Mechanical property | Izod impact strength (J/m) | 71 | 69 | 70 | 43 | 480 | 67 |
| | | Tensile strength (MPa) | 49 | 50 | 50 | 53 | 43 | 55 |
| | | Tensile modulus of elasticity (MPa) | 2,510 | 2,500 | 2,530 | 2,650 | 2,110 | 2,620 |
| | | Heat distortion temperature (° C.) | 109.3 | 109.1 | 109.0 | 109.6 | 105.3 | 123.6 |
| | | Vicat softening temperature (° C.) | 108.2 | 107.8 | 107.6 | 108.3 | 102.9 | 121.4 |
| | | Weight change rate (mass %) | 2.3 | 3.3 | 2.8 | 2.4 | 2.4 | 2.4 |

TABLE 2-continued

| | | | | | | | | |
|---|---|---|---|---|---|---|---|---|
| Evaluation (Molded article) | Optical performance | Haze (%) | 52 | 63 | 58 | 53 | 65 | 67 |
| | | Total light transmittance (%) | 71 | 68 | 70 | 69 | 52 | 58 |
| | Practical evaluation | Visual evaluation on joining | ○ | ○ | ○ | ○ | ○ | ○ |
| | Kneading property | Rotational torque (%)/evaluation (○/X) | 75/○ | 78/○ | 80/○ | 78/○ | 78/○ | 88/○ |
| | Evaluation on heat distortion resistance | Heat distortion resistance (150° C./hr) | ○ | ○ | ○ | ○ | ○ | ○ |

| | | Example | | | | | |
|---|---|---|---|---|---|---|---|
| | | 7 | 8 | 9 | 10 | 11 | 12 |
| Composition (Parts by mass) | Chlorinated polyvinyl chloride resin (A) | — | 100 | 100 | 100 | 100 | — |
| | Chlorinated polyvinyl chloride resin (B) | — | — | — | — | — | — |
| | Chlorinated polyvinyl chloride resin (C) | — | — | — | — | — | — |
| | Chlorinated polyvinyl chloride resin (D) | — | — | — | — | — | — |
| | Chlorinated polyvinyl chloride resin (E) | — | — | — | — | — | — |
| | Chlorinated polyvinyl chloride resin (F) | — | — | — | — | — | — |
| | Chlorinated polyvinyl chloride resin (G) | 100 | — | — | — | — | — |
| | Chlorinated polyvinyl chloride resin (H) | — | — | — | — | — | — |
| | Chlorinated polyvinyl chloride resin (I) | — | — | — | — | — | — |
| | Chlorinated polyvinyl chloride resin (J) | — | — | — | — | — | — |
| | Chlorinated polyvinyl chloride resin (K) | — | — | — | — | — | 100 |
| | Chlorinated polyvinyl chloride resin (L) | — | — | — | — | — | — |
| | Chlorinated polyvinyl chloride resin (M) | — | — | — | — | — | — |
| | Chlorinated polyvinyl chloride resin (N) | — | — | — | — | — | — |
| | Chlorinated polyvinyl chloride resin (O) | — | — | — | — | — | — |
| | Chlorinated polyvinyl chloride resin (P) | — | — | — | — | — | — |
| | Chlorinated polyvinyl chloride resin (Q) | — | — | — | — | — | — |
| | Thermal stabilizer — Butyltin mercaptan compound | 3.0 | 1.0 | 3.0 | 3.0 | 3.0 | 3.0 |
| | Diene rubber particles — MBS (average particle size: 0.105 μm) | 10.0 | 10.0 | 10.0 | 10.0 | 10.0 | 10.0 |
| | Polyvinyl chloride | 8.5 | 8.5 | 2.0 | 15.0 | 28.0 | 8.5 |
| | Polyethylene oxide wax | 0.5 | 0.5 | 0.5 | 0.5 | 0.5 | 0.5 |
| | 2,3-Dihydroxypropyl octadecanoate | 1.5 | 1.5 | 1.5 | 1.5 | 1.5 | 1.5 |
| | Dipentaerythrtol fatty acid ester | 1.0 | 1.0 | 1.0 | 1.0 | 1.0 | 1.0 |
| | Total | 124.5 | 122.5 | 118.0 | 131.0 | 144.0 | 124.5 |
| | Amount of vinyl chloride unit in the entire composition (mass %) | 55.0 | 36.2 | 32.1 | 38.9 | 44.4 | 75.1 |
| | Amount of vinyl chloride unit/(Chlorinated polyvinyl chloride resin + polyvinyl chloride) (mass %) | 63.1 | 40.9 | 37.2 | 44.3 | 49.9 | 86.2 |
| Ratio | Mass ratio (diene rubber particles/thermal stabilizer) | 3.3 | 10.0 | 3.3 | 3.3 | 3.3 | 3.3 |
| | Rubber particles — Specific gravity (g/cm³) | 1.00 | 1.00 | 1.00 | 1.00 | 1.00 | 1.00 |
| | Acrylic component/diene component | 2.0 | 2.0 | 2.0 | 2.0 | 2.0 | 2.0 |
| | Refractive index of rubber particles/amount of added chlorine of Chlorinated polyvinyl chloride resin | 0.235 | 0.148 | 0.148 | 0.148 | 0.148 | 0.620 |

TABLE 2-continued

| | | | | | | | | |
|---|---|---|---|---|---|---|---|---|
| Evaluation (Chlorinated-polyvinyl chloride resin composition) | Mechanical property | Izod impact strength (J/m) | 73 | 72 | 71 | 80 | 85 | 35 |
| | | Tensile strength (MPa) | 48 | 50 | 51 | 49 | 48 | 46 |
| | | Tensile modulus of elasticity (MPa) | 2,410 | 2,530 | 2,540 | 2,480 | 2,460 | 2,310 |
| | | Heat distortion temperature (° C.) | 96.1 | 112.4 | 109.5 | 108.7 | 102.5 | 91.5 |
| | | Vicat softening temperature (° C.) | 94.4 | 111.3 | 107.2 | 107.8 | 100.8 | 90.2 |
| | | Weight change rate (mass %) | 3.8 | 2.2 | 2.3 | 2.3 | 2.5 | 2.4 |
| Evaluation (Molded article) | Optical performance | Haze (%) | 66 | 51 | 50 | 65 | 67 | 70 |
| | | Total light transmittance (%) | 60 | 73 | 70 | 60 | 64 | 61 |
| | Practical evaluation | Visual evaluation on joining | ○ | ○ | ○ | ○ | ○ | ○ |
| | Kneading property | Rotational torque (%)/evaluation (○/X) | 60/○ | 88/○ | 87/○ | 73/○ | 71/○ | 55/○ |
| | Evaluation on heat distortion resistance | Heat distortion resistance (150° C./hr) | ○ | ○ | ○ | ○ | ○ | ○ |

| | | Example | | | | | |
|---|---|---|---|---|---|---|---|
| | | 13 | 14 | 15 | 16 | 17 | 18 |
| Composition (Parts by mass) | Chlorinated polyvinyl chloride resin (A) | — | — | 100 | 100 | 100 | — |
| | Chlorinated polyvinyl chloride resin (B) | — | — | — | — | — | — |
| | Chlorinated polyvinyl chloride resin (C) | — | — | — | — | — | — |
| | Chlorinated polyvinyl chloride resin (D) | — | — | — | — | — | — |
| | Chlorinated polyvinyl chloride resin (E) | — | — | — | — | — | — |
| | Chlorinated polyvinyl chloride resin (F) | — | — | — | — | — | — |
| | Chlorinated polyvinyl chloride resin (G) | — | — | — | — | — | — |
| | Chlorinated polyvinyl chloride resin (H) | — | — | — | — | — | — |
| | Chlorinated polyvinyl chloride resin (I) | — | — | — | — | — | — |
| | Chlorinated polyvinyl chloride resin (J) | — | — | — | — | — | 100 |
| | Chlorinated polyvinyl chloride resin (K) | — | — | — | — | — | — |
| | Chlorinated polyvinyl chloride resin (L) | — | — | — | — | — | — |
| | Chlorinated polyvinyl chloride resin (M) | 100 | — | — | — | — | — |
| | Chlorinated polyvinyl chloride resin (N) | — | — | — | — | — | — |
| | Chlorinated polyvinyl chloride resin (O) | — | 100 | — | — | — | — |
| | Chlorinated polyvinyl chloride resin (P) | — | — | — | — | — | — |
| | Chlorinated polyvinyl chloride resin (Q) | — | — | — | — | — | — |
| | Thermal stabilizer — Butyltin mercaptan compound | 3.0 | 3.0 | 3.0 | 3.0 | 3.0 | 3.0 |
| | Diene rubber particles — MBS (average particle size: 0.105 μm) | 10.0 | 10.0 | 10.0 | 10.0 | 10.0 | 10.0 |
| | Polyvinyl chloride | 8.5 | 8.5 | 8.5 | 1.0 | 30.0 | 3.0 |
| | Polyethylene oxide wax | 0.5 | 0.5 | 1.5 | 0.5 | 0.5 | 0.5 |
| | 2,3-Dihydroxypropyl octadecanoate | 1.5 | 1.5 | 2.5 | 1.5 | 1.5 | 1.5 |
| | Dipentaerythrtol fatty acid ester | 1.0 | 1.0 | 2.0 | 1.0 | 1.0 | 1.0 |
| | Total | 124.5 | 124.5 | 127.5 | 117.0 | 146.0 | 119.0 |
| | Amount of vinyl chloride unit in the entire composition (mass %) | 36.5 | 50.2 | 34.8 | 31.5 | 45.1 | 32.7 |
| | Amount of vinyl chloride unit/(Chlorinated polyvinyl chloride resin + polyvinyl chloride) (mass %) | 41.9 | 57.6 | 40.9 | 36.5 | 50.7 | 37.8 |

TABLE 2-continued

| | | | | | | | | |
|---|---|---|---|---|---|---|---|---|
| Ratio | | Mass ratio (diene rubber particles/thermal stabilizer) | 3.3 | 3.3 | 3.3 | 3.3 | 3.3 | 3.3 |
| | Rubber particles | Specific gravity (g/cm$^3$) | 1.00 | 1.00 | 1.00 | 1.00 | 1.00 | 1.00 |
| | | Acrylic component/ diene component | 2.0 | 2.0 | 2.0 | 2.0 | 2.0 | 2.0 |
| Refractive index of rubber particles/ amount of added chlorine of Chlorinated polyvinyl chloride resin | | | 0.150 | 0.207 | 0.148 | 0.148 | 0.148 | 0.099 |
| Evaluation (Chlorinated-polyvinyl chloride resin composition) | Mechanical property | Izod impact strength (J/m) | 73 | 45 | 70 | 70 | 74 | 65 |
| | | Tensile strength (MPa) | 51 | 49 | 50 | 52 | 48 | 51 |
| | | Tensile modulus of elasticity (MPa) | 2,510 | 2,460 | 2,520 | 2,540 | 2,470 | 2,600 |
| | | Heat distortion temperature (° C.) | 109.0 | 100.2 | 109.1 | 107.7 | 102.8 | 127.3 |
| | | Vicat softening temperature (° C.) | 107.2 | 98.3 | 107.4 | 105.6 | 100.2 | 124.9 |
| | | Weight change rate (mass %) | 2.4 | 2.3 | 2.2 | 2.2 | 2.4 | 2.3 |
| Evaluation (Molded article) | Optical performance | Haze (%) | 64 | 68 | 58 | 48 | 62 | 57 |
| | | Total light transmittance (%) | 61 | 52 | 68 | 71 | 55 | 65 |
| | Practical evaluation | Visual evaluation on joining | ◯ | ◯ | ◯ | ◯ | ◯ | ◯ |
| | Kneading property | Rotational torque (%)/evaluation (◯/X) | 78/◯ | 63/◯ | 66/◯ | 85/◯ | 65/◯ | 88/◯ |
| | Evaluation on heat distortion resistance | Heat distortion resistance (150° C./hr) | ◯ | ◯ | ◯ | ◯ | ◯ | ◯ |

TABLE 3

| | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Composition (Parts by mass) | | | | | | | | | | | | | | |
| Chlorinated polyvinyl chloride resin (A) | 100 | — | — | — | — | — | — | — | — | — | — | — | — | — |
| Chlorinated polyvinyl chloride resin (B) | — | 100 | — | — | — | — | — | — | — | — | — | — | — | — |
| Chlorinated polyvinyl chloride resin (C) | — | — | 100 | — | — | — | — | — | — | — | — | — | — | — |
| Chlorinated polyvinyl chloride resin (D) | — | — | — | 100 | — | — | — | — | — | — | — | — | — | — |
| Chlorinated polyvinyl chloride resin (E) | — | — | — | — | — | — | — | — | — | — | — | — | — | 100 |
| Chlorinated polyvinyl chloride resin (F) | — | — | — | — | — | — | — | — | — | — | — | — | — | — |
| Chlorinated polyvinyl chloride resin (G) | — | — | — | — | — | — | — | — | — | — | — | — | — | — |
| Chlorinated polyvinyl chloride resin (H) | — | — | — | — | 100 | — | — | — | — | — | — | — | — | — |
| Chlorinated polyvinyl chloride resin (I) | — | — | — | — | — | 100 | — | — | — | — | — | — | — | — |
| Chlorinated polyvinyl chloride resin (J) | — | — | — | — | — | — | — | — | — | — | — | — | — | — |
| Chlorinated polyvinyl chloride resin (K) | — | — | — | — | — | — | 100 | — | — | — | — | — | — | — |
| Chlorinated polyvinyl chloride resin (L) | — | — | — | — | — | — | — | — | — | — | — | — | — | — |
| Chlorinated polyvinyl chloride resin (M) | — | — | — | — | — | — | — | 100 | — | — | — | — | — | — |
| Chlorinated polyvinyl chloride resin (N) | — | — | — | — | — | — | — | — | 100 | 100 | — | — | — | — |
| Chlorinated polyvinyl chloride resin (O) | — | — | — | — | — | — | — | — | — | — | 100 | — | — | — |
| Chlorinated polyvinyl chloride resin (P) | — | — | — | — | — | — | — | — | — | — | — | 100 | — | — |
| Chlorinated polyvinyl chloride resin (Q) | — | — | — | — | — | — | — | — | — | — | — | — | 100 | — |
| Thermal stabilizer Butyltin mercaptan compound | 3.0 | 3.0 | 3.0 | 3.0 | 3.0 | 3.0 | 3 | 3 | 3 | — | — | 3 | 3 | 3.0 |
| Diene rubber particles MBS (average particle size: 0.105 μm) | 10.0 | 10.0 | 10.0 | 10.0 | 10.0 | 10.0 | 10 | 10 | 10 | 10 | 7.5 | 10 | 10 | 10.0 |
| Polyvinyl chloride | 8.5 | 8.5 | 35.0 | 0.1 | 8.5 | 8.5 | 8.5 | 8.5 | 8.5 | 8.5 | 18.75 | 8.5 | 8.5 | 0.1 |
| Polyethylene oxide wax | 0.5 | 0.5 | 0.5 | 0.5 | 0.5 | 0.5 | 0.5 | 0.5 | 0.165 | 0.5 | 21.25 | 0.5 | 0.5 | 0.5 |
| 2,3-Dihydroxypropyl octadecanoate | 1.5 | 1.5 | 1.5 | 1.5 | 1.5 | 1.5 | 1.5 | 1.5 | 0.495 | 1.5 | 0.75 | 1.5 | 1.5 | 1.5 |
| Dipentaerythritol fatty acid ester | 1.0 | 1.0 | 1.0 | 1.0 | 1.0 | 1.0 | 1 | 1 | 0.33 | 1 | 2.25 | 1 | 1 | 1.0 |
| Total | 124.5 | 124.5 | 151.0 | 116.1 | 124.5 | 124.5 | 124.5 | 124.5 | 122.49 | 141.5 | 1.5 | 124.5 | 124.5 | 116.1 |
| Ratio Amount of vinyl chloride unit in the entire composition (mass %) | 35.7 | 35.7 | 47.0 | 31.0 | 14.9 | 83.1 | 10.0 | 34.9 | 36.2 | 31.4 | 152 | 35.7 | 35.7 | 31.0 |
| Amount of vinyl chloride unit/(Chlorinated polyvinyl chloride resin + polyvinyl chloride) (mass %) | 40.9 | 40.9 | 52.5 | 36.0 | 17.1 | 95.4 | 11.5 | 40.1 | 40.9 | 40.9 | 37.6 | 40.9 | 40.9 | 36.0 |
| Mass ratio (diene rubber particles/thermal stabilizer) | 3.3 | 3.3 | 3.3 | 3.3 | 3.3 | 3.3 | 3.3 | 3.3 | 3.3 | 0.5 | 47.1 | 3.3 | 3.3 | 3.3 |
| Rubber particles Specific gravity (g/cm³) | 1.00 | 1.00 | 1.00 | 1.00 | 1.00 | 1.00 | 1.00 | 1.00 | 1.00 | 1.00 | 2.5 | 1.00 | 1.00 | 1.00 |
| Acrylic component/diene component | 2.0 | 2.0 | 2.0 | 2.0 | 2.0 | 2.0 | 2.0 | 2.0 | 2.0 | 2.0 | 1.00 | 2.0 | 2.0 | 2.0 |
| Weight change rate (mass %) | 0.148 | 0.148 | 0.148 | 0.148 | 0.05 | 1.938 | 0.099 | 0.145 | 0.148 | 0.148 | 2.0 | 0.378 | 0.620 | 0.105 |
| Refractive index of rubber particles/amount of added chlorine of Chlorinated polyvinyl | | | | | | | | | | | 0.148 | | | |
| Evaluation Chlorinated polyvinyl chloride resin composition Mechanical property Izod impact strength (J/m) | 70 | 69 | 36 | 91 | 62 | 73 | 83 | 72 | 70 | 67 | 300 | 45 | 42 | 85 |
| Tensile strength (MPa) | 50 | 50 | 47 | 52 | 55 | 45 | 50 | 40 | 50 | 44 | 47 | 46 | 45 | 52 |
| Tensile modulus of elasticity (MPa) | 2,490 | 2,540 | 2,440 | 2,550 | 2,650 | 2,280 | 2,620 | 2,520 | 2,510 | 2,350 | 2,400 | 2,320 | 2,300 | 2,540 |
| Heat distortion temperature (° C.) | 109.1 | 108.8 | 103.3 | 111.6 | 124.5 | 82.3 | 127.9 | 110.1 | 109.8 | 88.1 | 96.8 | 91.1 | 82.5 | 125.3 |
| Vicat softening temperature (° C.) | 107.6 | 107.1 | 101.8 | 109.5 | 122 | 80.8 | 126.1 | 107.8 | 107.3 | 87.2 | 75.5 | 88.9 | 80.6 | 122.9 |
| Weight change rate (mass %) | 2.4 | 2.3 | 2.2 | 2.4 | 2.3 | 2.4 | 2.3 | 2.4 | 2.3 | 13.8 | 6.8 | 2.4 | 2.3 | 2.4 |
| Evaluation (Molded article) Optical performance Total light transmittance (%) | 87 | 81 | 85 | 48 | 60 | 55 | 53 | 84 | 52 | 58 | 84 | 76 | 82 | 53 |
| Haze (%) | 43 | 48 | 42 | 85 | 62 | 70 | 71 | 46 | 71 | 69 | 41 | 48 | 45 | 81 |
| Practical evaluation Visual evaluation on joining | X | X | X | ◯ | ◯ | ◯ | X | X | ◯ | ◯ | X | ◯ | X | ◯ |
| Kneading property Rotational torque (%)/evaluation (◯/X) | 77/◯ | 91/X | 79/◯ | 98/X | 98/X | 55/X | 98/X | 76/◯ | 100/X | 50/X | 52/X | 58/◯ | 55/◯ | 93/X |
| Evaluation on heat distortion Heat distortion resistance (150° C./hr) | ◯ | X | ◯ | X | X | X | ◯ | X | X | X | X | X | X | ◯ |

INDUSTRIAL APPLICABILITY

The present invention can provide a resin composition for molding capable of producing a molded article that has excellent heat distortion resistance, excellent mechanical properties, high impact resistance, and high transparency and has a smaller change in weight at high temperature. The present invention can also provide a molded article and a joint each produced from the resin composition for molding.

The invention claimed is:

1. A joint molded from a resin composition for molding, wherein the joint is transparent, and
wherein the resin composition for molding comprises: a chlorinated polyvinyl chloride resin; a polyvinyl chloride; and a thermal stabilizer,
the chlorinated polyvinyl chloride resin containing structural units (a) to (c) represented by the following formulas (a) to (c) in proportions of 5 to 90 mol % of the structural unit (a), 5 to 40 mol % of the structural unit (b), and 5 to 55 mol % of the structural unit (c) based on a total number of moles of the structural units (a), (b), and (c),
the chlorinated polyvinyl chloride resin having a glass transition temperature of 80° C. to 150° C., and
the polyvinyl chloride being contained in an amount of 1 to 30 parts by mass based on 100 parts by mass of the chlorinated polyvinyl chloride resin, $$—CH_2—CHCl— \quad (a)$$

$$—CH_2—CCl_2— \quad (b)$$

$$—CHCl—CHCl— \quad (c).$$

2. The joint according to claim 1,
wherein the resin composition for molding further comprises diene rubber particles.

3. The joint according to claim 2,
wherein the diene rubber particles have an average particle size of 0.001 to 1.0 μm.

4. The joint according to claim 1,
wherein the resin composition for molding further comprises a lubricant.

5. The joint according to claim 4,
wherein the lubricant comprises a low-melting-point lubricant having a melting point of 80° C. or lower and a high-melting-point lubricant having a melting point of higher than 80° C.

6. The joint according to claim 1,
wherein the resin composition for molding comprises the thermal stabilizer in an amount of 0.4 to 10 parts by mass based on 100 parts by mass of the chlorinated polyvinyl chloride resin.

* * * * *